(12) United States Patent
Barbas et al.

(10) Patent No.: US 6,233,240 B1
(45) Date of Patent: May 15, 2001

(54) EVENT BASED RATE POLICING WITH A JUMPING WINDOW

(75) Inventors: Steve N. Barbas, Billerica; Michael J. Homberg, Westborough, both of MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/426,600

(22) Filed: Oct. 26, 1999

Related U.S. Application Data
(60) Provisional application No. 60/105,825, filed on Oct. 27, 1998.

(51) Int. Cl.[7] .................................................. H04L 12/56
(52) U.S. Cl. ............................................ 370/395; 370/233
(58) Field of Search .................................... 370/253, 234, 370/235, 232, 233, 397, 230, 231, 236, 389, 392, 394, 395

(56) References Cited

U.S. PATENT DOCUMENTS

| | | | |
|---|---|---|---|
| 5,218,456 | 6/1993 | Stegbauer et al. ..................... | 358/404 |
| 5,313,454 | 5/1994 | Bustini et al. ......................... | 370/60 |
| 5,315,591 | 5/1994 | Brent et al. ........................... | 370/85.6 |
| 5,408,472 | 4/1995 | Hluchyj et al. ....................... | 370/94.1 |
| 5,425,029 | 6/1995 | Hluchyj et al. ....................... | 370/94.1 |
| 5,461,611 | 10/1995 | Drake, Jr. et al. ..................... | 370/54 |
| 5,485,455 | 1/1996 | Dobbins et al. ....................... | 370/60 |
| 5,490,141 | 2/1996 | Lai et al. .............................. | 370/60.1 |
| 5,497,375 | 3/1996 | Hluchyj et al. ....................... | 370/94.1 |
| 5,519,689 | * 5/1996 | Kim . | |
| 5,524,006 | 6/1996 | Hluckyj ................................ | 370/84 |
| 5,541,913 | 7/1996 | Witters et al. ......................... | 370/17 |
| 5,550,808 | * 8/1996 | Shimokoshi . | |
| 5,553,073 | 9/1996 | Barraclough et al. ................. | 370/85.5 |
| 5,581,545 | * 12/1996 | Moritomo ............................. | 370/237 |
| 5,666,353 | 9/1997 | Klausmeier et al. .................. | 370/230 |
| 5,771,234 | 6/1998 | Wu et al. .............................. | 370/396 |
| 5,802,278 | 9/1998 | Isfeld et al. ........................... | 395/200.02 |
| 5,812,774 | 9/1998 | Kempf ............................... | 395/200.42 |
| 5,818,815 | * 10/1998 | Carpentier et al. ................... | 370/218 |
| 5,828,653 | 10/1998 | Goss ..................................... | 370/230 |
| 5,828,654 | * 10/1998 | Takase et al. ......................... | 370/233 |
| 5,872,769 | 2/1999 | Caldara et al. ........................ | 370/230 |
| 5,901,147 | 5/1999 | Joffe ..................................... | 370/412 |
| 6,108,303 | * 8/2000 | Fahmi et al. .......................... | 370/230 |

\* cited by examiner

*Primary Examiner*—Douglas Olms
*Assistant Examiner*—Ken Vanderpuye
(74) *Attorney, Agent, or Firm*—Weingarten, Schurgin, Gagnebin & Hayes LLP

(57) ABSTRACT

A system and method for performing event-based rate policing using varying window start times. Rate policing overhead, including counter and timer monitoring and resetting, is performed only as needed and in response to actual received traffic on each connection. As the last bit of a data unit is received from an external network, an "event time stamp" is generated and associated with the data unit, for example as part of an internal header or trailer attached to the data unit. To determine if a rate policing window was active when the frame was received, the event time stamp is compared with a sum of a window start time and a window period value stored in association with the connection on which the data unit was received. If the associated event time stamp indicates a time prior to the sum of the associated window start time and window period, then a rate policing window is determined to have been active when the frame was received. In that case, rate policing is performed on the received frame with respect to the active rate policing window. If a rate policing window was not active when the frame was received, then a new rate policing window is started, and the frame is rate policed in a new rate policing window, which is started at a time equal to the event time stamp associated with the received frame.

19 Claims, 12 Drawing Sheets

| | | |
|---|---|---|
| Buffer Pool ID | | 102 |
| Queue List ID | | 104 |
| Queue ID | | 106 |
| QFC Enable | | 108 |
| Flow Control Mode | | 110 |
| Interval Active | | 112 |
| Interval Start Time | | 114 |
| Assigned Bc | | 116 |
| Assigned Be | | 118 |
| Current Bc | | 120 |
| Current Be | | 122 |
| Rate Policing Mode | | 124 |
| Interval Duration | | 125 |
| ⋮ | | |

*Fig. 4* — Connection Descriptor 100

| | |
|---|---|
| Head Pointer | 142 |
| Queue List Congested Count | 144 |
| Queue List Queue Size | 146 |
| Queue List Frame Size Limit | 148 |
| ⋮ | |

*Fig. 5* — Queue List Descriptor 140

| | |
|---|---|
| Next Queue Descriptor Pointer | 162 |
| Head Pointer | 164 |
| Queue High Water Mark | 168 |
| Queue Low Water Mark | 170 |
| Queue Size Limit | 172 |
| Queue Size | 174 |
| Time Stamp Selection | 176 |
| Queue List Congestion Enable | 178 |
| Queue Congestion | 180 |
| Tail Pointer | 182 |
| Queue Enable | 184 |
| ⋮ | |

Queue Descriptor 160

*Fig. 6*

| | |
|---|---|
| Next Queue Entry Pointer | 202 |
| Flow Control Mode | 204 |
| QFC Enable | 206 |
| DE Bit | 208 |
| Frame Pointer | 210 |
| ⋮ | |

Queue Entry 200

*Fig. 7*

| | |
|---|---|
| Buffer Pool Enable | 212 |
| Current Individual Buffer Count | 213 |
| Current Shared Buffer Count | 214 |
| Assigned Shared Buffer Count | 215 |

Buffer Pool Descriptor 211

*Fig. 8*

| | |
|---|---|
| Next Buffer Pointer | 222 |
| Byte Count | 224 |
| Time Stamp Range Selection | 226 |
| Time Stamp | 228 |
| EOP | 230 |
| SOP | 232 |
| ⋮ | |

Buffer Descriptor 220

*Fig. 9*

| | |
|---|---|
| QoS Group A | 241a |
| QoS Group B | 241b |
| QoS Group C | 241c |
| QoS Group C | 241d |
| QoS Group D | 241e |
| QoS Group E | 241f |
| QoS Group E | 241g |

⎫ 241

Scheduling Table 240

EVENT BASED RATE POLICING WITH A JUMPING WINDOW

CROSS REFERENCE TO RELATED APPLICATIONS

This application claims the priority of U.S. Provisional Application No. 60/105,825, filed Oct. 27, 1998, entitled FRAME RELAY METHODS AND APPARATUS

STATEMENT REGARDING FEDERALLY SPONSORED RESEARCH OR DEVELOPMENT

BACKGROUND OF THE INVENTION

The present invention relates generally to communication systems, and more specifically to a system and method for monitoring and controlling traffic through a network device in order to protect network resources against unauthorized or malicious use.

In existing systems, access to communication networks, such as Asynchronous Transfer Mode (ATM) networks, is provided through interfaces provided in or associated with host computer systems. The interface between a host computer system and an ATM network is known as a User Network Interface (UNI). Each UNI may include one or more virtual connections ("connections") between the host computer system and other host systems. When a virtual connection is established, bandwidth may be reserved for use by the connection. Such reserved bandwidth is referred to as "guaranteed" bandwidth. An amount of bandwidth in addition to the guaranteed bandwidth may also be defined in association with a virtual connection. Such additional bandwidth is known as "available" bandwidth. Network resources are used to support available bandwidth traffic for a virtual connection only to the extent they are not being used to support guaranteed bandwidth traffic. Guaranteed bandwidth and available bandwidth are sometimes referred to as the Committed Information Rate ("CIR") and Excess Information Rate ("EIR") of a virtual connection.

In order for multiple connections to coexist within a given network device, each connection must be monitored to determine when the amount of traffic it is carrying is exceeding its guaranteed bandwidth allocation. Otherwise, resources may be allocated to support available bandwidth traffic on a first connection that should be allocated to support guaranteed bandwidth on another connection. Accordingly, network devices such as switches provide functionality known as "rate policing" to ensure that received data units are correctly identified as being within the guaranteed bandwidth or available bandwidth of their respective connections.

In existing systems, rate policing has been performed by monitoring the amount of data that is received and accepted on a virtual connection over a fixed time period, referred to as the rate policing window. A guaranteed bandwidth data limit for the rate policing window of a given connection is determined as a function of the amount of guaranteed bandwidth for the connection, and the duration of the connection's rate policing window. When the amount of traffic received over a connection exceeds the guaranteed bandwidth data limit of the connection during a rate policing window, any further traffic received over that connection during the rate policing window is considered available bandwidth traffic.

Existing rate policing systems have employed a byte counter and a rate policing window timer to monitor the received traffic for each connection they support. These systems modify the counter as traffic is received to reflect the amount of traffic received. When the value of the byte counter for a connection indicates that the guaranteed bandwidth limit for a rate policing window has been reached, the rate policing function turns off the connection, dropping any subsequent data units received for the remainder of the rate policing window. The amount of traffic discarded during the remainder of the rate policing window may be counted so that it can later be read or reported for purposes of network management. At the end of each rate policing window, the counter for the associated connection is set to zero and the connection turned back on if necessary.

As the number of connections that must be supported by a network device increases, the costs associated with performing rate policing have become unacceptably high. Specifically, the costs associated with providing hardware and/or software support for periodically resetting a separate timer and counter for each of several thousand connections, irrespective of whether the connections are currently being used, may be prohibitively high.

For these reasons, it would be desirable to have a system for performing rate policing which does not require constant monitoring of separate timers and counters for each of a large number of connections, including resetting such counters and timers at the end of each rate policing window. The system should further be capable of conveniently supporting large numbers of virtual connections, and operating compatibly with contemporary communications protocols such as Asynchronous Transfer Mode (ATM).

BRIEF SUMMARY OF THE INVENTION

In accordance with the invention there is disclosed a system and method for performing event-based rate policing using varying window start times. In the disclosed system, rate policing processing overhead, including counter and timer monitoring and resetting, is performed only as needed and in response to actual received traffic on each connection. As the last bit of a data unit is received from an external network, an "event time stamp" is generated and associated with the data unit, for example as part of an internal header or trailer attached to the data unit. In order to determine if a rate policing window was active when the frame was received, the event time stamp is compared with a sum of a window start time and a window period value stored in association with the connection on which the data unit was received. If the associated event time-stamp indicates a time prior to the sum of the associated window start time and window period, then a rate policing window is determined to have been active when the frame was received. In that case, rate policing is performed on the received frame with respect to the active rate policing window. If a rate policing window was not active when the frame was received, then a new rate policing window is started, and the frame is rate policed in a new rate policing window, which is started at a time equal to the event time-stamp associated with the received frame.

In this way, there is provided a system and method for supporting rate policing which does not require constant monitoring and resetting of counters and timers for all connections. The disclosed system conveniently supports large numbers of virtual connections through a network device, and may be employed in network devices supporting various communication protocols, including Asynchronous Transfer Mode (ATM) and Frame Relay protocols.

BRIEF DESCRIPTION OF THE SEVERAL VIEWS OF THE DRAWING

The invention will be more fully understood by reference to the following detailed description of the invention in conjunction with the drawings, of which:

FIG. 4 shows an illustrative format for a connection descriptor;

FIG. 5 shows an illustrative format for a queue list descriptor;

FIG. 6 shows an illustrative format for a queue descriptor;

FIG. 7 shows an illustrative format for a queue entry;

FIG. 8 shows an illustrative format for a buffer pool descriptor;

FIG. 9 shows an illustrative format for a buffer descriptor;

DETAILED DESCRIPTION OF THE INVENTION

Figure 1:
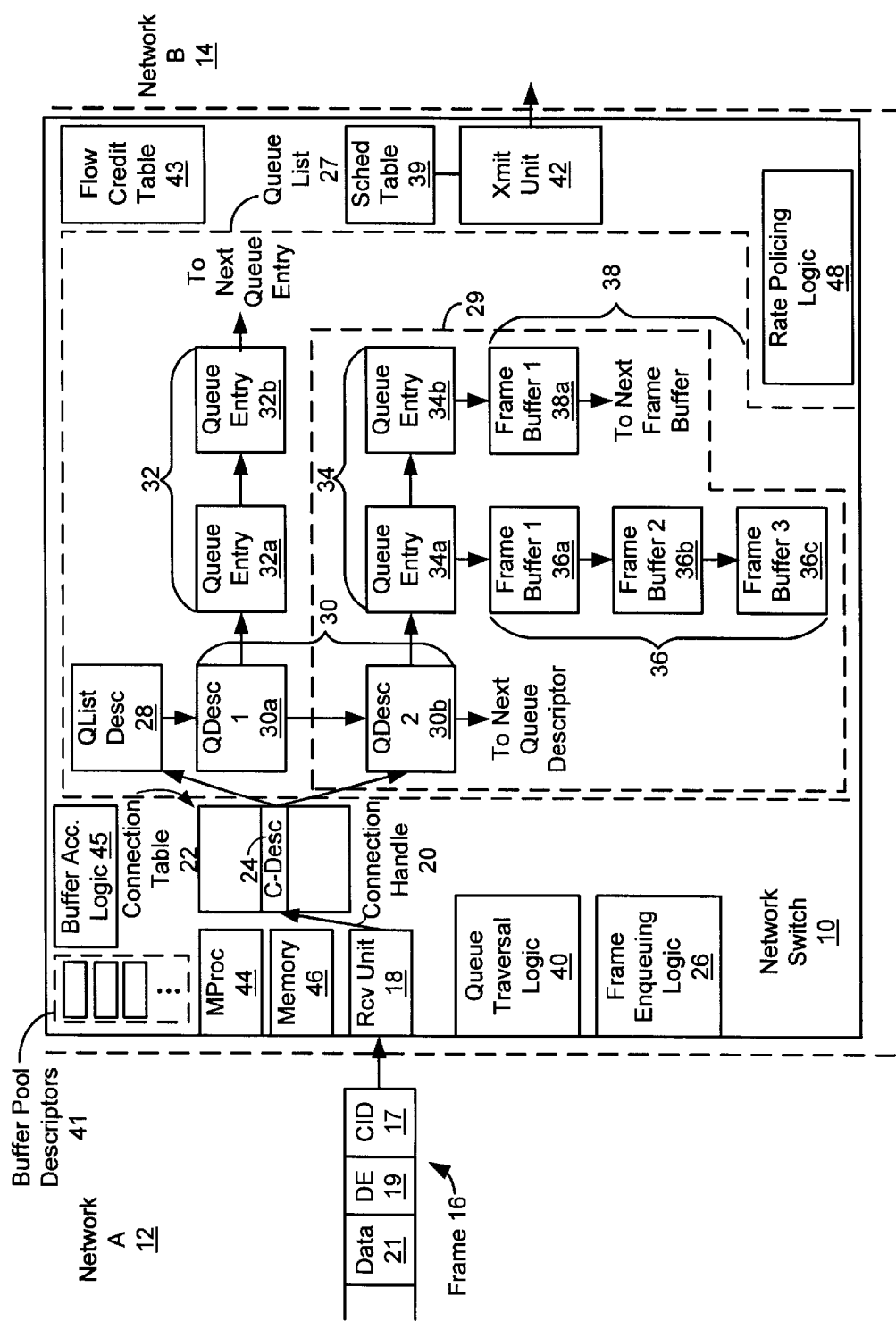
FIG. 1 is a block diagram showing components in an illustrative embodiment of the invention in a network switch.

Consistent with the present invention, a system and method are disclosed for storing and dequeuing received data units such that their relative priorities are efficiently preserved. As shown in FIG. 1, a network switch 10 is connected to a communications network A 12 as well as to a communications network B 14. During operation of the network switch 10, a frame 16 including a connection identifier 17, a discard enable bit 19, and data 21, is received by a receiver unit 18. The frame 16 is, for example, a frame relay frame consistent with the International Standards Organization's High-level Data Link Control (HDLC) frame format. The receiver unit 18 generates a connection handle 20 associated with the connection identifier 17. The connection handle 20 is an index identifying a connection descriptor 24 in a connection table 22. The connection descriptor 24 includes parameters describing a virtual connection on which the frame 16 was received. The connection descriptor 24 includes pointers indicating 1) a buffer pool from which buffers are to be allocated to store the frame 16, 2) a queue list 27 having a queue list descriptor 28, and 3) a queue 29 within the queue list 27. The connection identifiers contained within the connection table 22 correspond, for purposes of illustration, to what are sometimes generally referred to as DLCI (Data Link Connection Identifier) table entries. The set of virtual connections associated with a single queue list, such as queue list 27, is referred to as a Quality of Service (QoS) group.

The queue list descriptor 28 includes information related to the queue list 27, including at least one pointer to the queue descriptors 30, which are, for example, arranged in a linked list. Each of the queue descriptors 30 includes an indication of a linked list of queue entries. For example, the queue descriptor 30a includes pointers to the head and tail of a linked list of queue entries 32, shown including queue entries 32a and 32b, and the queue descriptor 30b includes pointers to a head and tail of a linked list of queue entries 34, shown including queue entry 34a and queue entry 34b. During operation, queue entries are added at the tail of a queue, and dequeued from the head.

As shown in FIG. 1, the connection descriptor 24 indicates the queue associated with the queue descriptor 30b in the queue list associated with the queue list descriptor 28. Portions of the frame 16 are stored in a linked list of frame buffers 38 associated with a queue entry 34b at the tail of the queue associated with the queue descriptor 30b. Accordingly, as illustrated in FIG. 1, the frame buffers 36 associated with the queue entry 34a store portions of another, previously received, frame.

Frame buffers for storing a received frame are allocated from a buffer pool associated with the queue list for that received frame. Accordingly, when the frame 16 is received by the network switch 10, the receiver unit 18 determines a buffer pool associated with the connection from the connection identifier 17. For example, the connection descriptor 24 located using the connection handle 20 may contain an identifier or pointer indicating one of the buffer pool descriptors 41 that is associated with a buffer pool to be used to receive the frame 16. The frame 16 is then stored within the buffer pool. Buffers storing portions of the frame are linked together in a linked list of frame buffers, shown as frame buffers 38 in FIG. 1, and associated with the queue entry 34b at the tail of the queue 29 associated with the queue descriptor 30b. The steps performed to receive the frame 16 by the network switch 10 are, for example, performed under control of the frame enqueuing logic 26, in combination with the receiver unit 18 and the rate policing logic 48. The steps performed by the frame enqueuing logic 26 are further described below with reference to FIG. 2. The buffer accounting logic 45 maintains the buffer pools associated with the buffer pool descriptors 41, in response to allocation and deallocation of buffers by the receiver unit 18 and transmit unit 42, respectively.

As bandwidth associated with the transmit unit 42 becomes available, frames may be dequeued for subsequent transmission from queues in the queue list 27 by the queue traversal logic 40. The illustrative scheduling table 39, as further described in connection with FIG. 10, may be used to determine which QoS group is eligible to transmit next. The queues in the queue list 27 each have a priority, which may be reflected in the order of the queues within the queue list 27. For example, the first queue in the queue list is a queue having a highest relative priority with respect to other queues in the list, with subsequent queues having progressively lower priorities. Thus, in order to determine a highest priority stored frame to transmit next, the queue traversal logic 40 searches the heads of the queues in the queue list sequentially from first to last. The steps performed by the queue traversal logic 40 are further described below with reference to FIG. 3.

Also shown in FIG. 1 is a flow credit table 43. The flow credit table 43 includes a number of entries, each of which is associated with a particular QoS group. The field or fields within each flow credit table entry define the current number of transmit credits available to the associated QoS group.

Accordingly, in an illustrative embodiment, the index of a flow credit table entry associated with a given QoS group is equal to or derived from a queue list number or pointer which may be used to identify the queue list for that QoS group. In an illustrative embodiment, in which the QFC credit based flow control protocol may be used in association with at least one virtual connection, transmit credits may be associated with QFC groups. The disclosed system permits assignment of a QFC group to a QoS group.

The functions described herein as being performed by programs executing on the processor 44 and stored in the memory 46, as well as by the receiver unit 18, queue traversal logic 40, frame enqueuing logic 26, rate policing logic 48, transmit unit 42, and buffer accounting logic 45, in association with the data structures also shown in FIG. 1, may be considered to be performed by a single logical "controller". Such a controller may be embodied or implemented using various combinations of hardware components, such as Application Specific Integrated Circuits (ASICs), field programmable gate arrays, processors, state machines, or programmed controllers, and/or software. Accordingly, it should be recognized that specific functionalities described as being performed in hardware may alternatively be performed in software, and vice versa, depending on the cost and performance objectives of a specific implementation or design.

Figure 2:
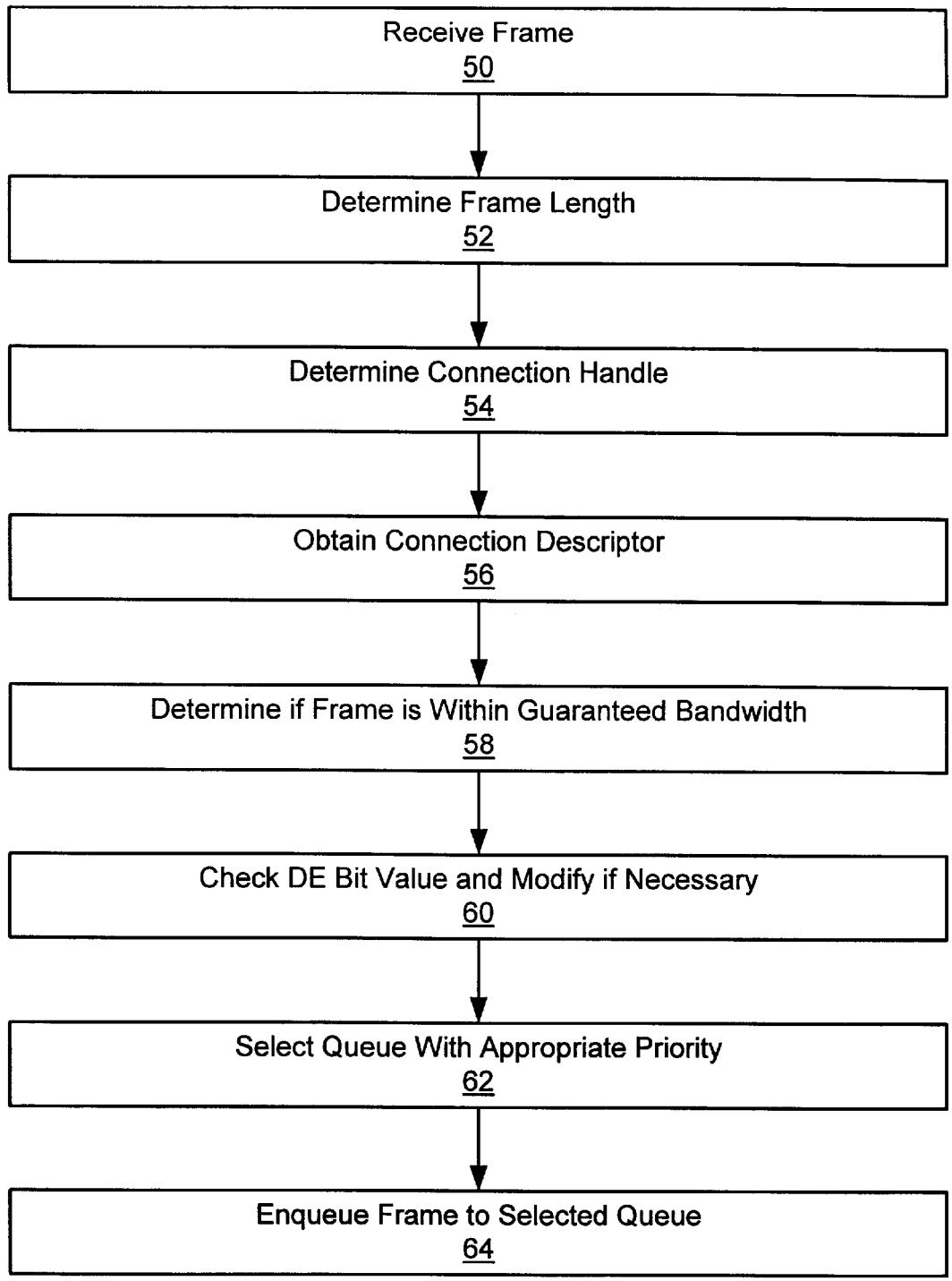
FIG. 2 is a flow chart showing steps performed by the illustrative embodiment of FIG. 1 to receive and store a frame.

FIG. 2 shows steps performed by an illustrative embodiment of the disclosed system to receive and store a frame. The steps of FIG. 2 are, for example, performed using a combination of the receiver unit 18, frame enqueuing logic 26, and rate policing logic 48 as shown in FIG. 1. At step 50, the receiver unit 18 receives a frame from the network A 12, and begins storing it within the network switch 10. At step 52, the receiver unit 18 determines a length of the received frame, for example in response to a length value stored within the frame itself, or alternatively by counting the number of received bytes associated with the frame. At step 54, the receiver unit 18 determines a connection handle associated with the received frame, for example in response to a connection identifier contained within the received frame. Then, using the connection handle obtained at step 54, the receiver unit 18 obtains a connection descriptor 24 containing information related to the connection on which the frame was received. An illustrative format of a connection descriptor is shown in FIG. 4.

At step 58, the rate policing logic performs rate policing on the received frame. During rate policing of the received frame, the rate policing logic determines whether the received frame is part of the guaranteed bandwidth or available bandwidth associated with the connection on which the frame was received. At step 60, the rate policing logic checks the DE bit value in the received frame. If the DE bit in the received frame is clear, and the rate policing logic determines at step 58 that the received frame is part of the available bandwidth associated with the connection on which the frame was received, then, at step 60, the rate policing logic sets the DE bit.

At step 62, the frame enqueuing logic selects one of the queues in the queue list associated with the connection on which the frame was received. In an illustrative embodiment, when a virtual connection is established, it is associated with a single queue in a queue list. Different virtual connections may be associated with different queues within a single queue list, or with queues in different queue lists. Frame enqueuing logic 26 selects the associated queue for a received frame based on information contained in the connection descriptor for the connection on which the frame was received. At step 64, the frame enqueuing logic enqueues the received frame to the tail of the queue selected at step 62.

Figure 3:
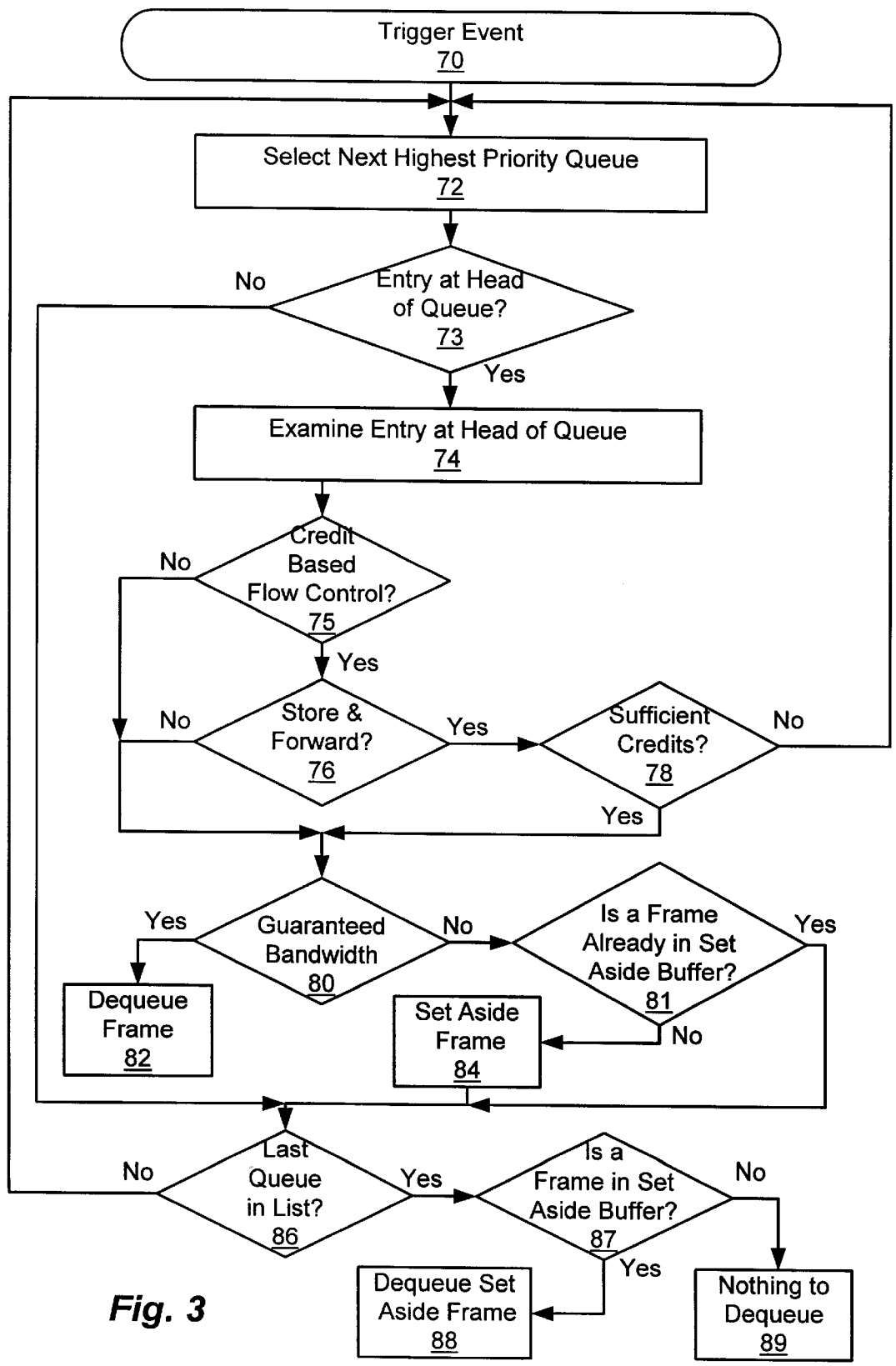
FIG. 3 is a flow chart showing steps performed by the illustrative embodiment of FIG. 1 to dequeue a frame for transmission.

FIG. 3 shows steps performed in an illustrative embodiment of the disclosed system to dequeue a frame that has been enqueued to one of the queues in the prioritized queue list 27 as shown in FIG. 1. The steps of FIG. 3 are, for example, performed by the queue traversal logic 40 of FIG. 1 in response to a trigger event 70. Illustrative trigger events include receipt of a frame when no other frames are stored in any of the queues in the queue list, completion of a frame transmission by the transmission unit, and/or a transmission credit update when transmissions have been blocked due to insufficient transmission credits.

At step 72 the queue traversal logic 40 selects a next queue for processing, for example, the highest priority queue remaining in the queue list that has not previously been processed during the current queue list traversal. At the beginning of a queue list traversal, in an embodiment in which the queues are arranged from first to last in the queue list in order of descending priority, the queue traversal logic 40 selects a first queue in the queue list. At step 73, the queue traversal logic 40 determines if the selected queue is empty by determining whether there is a queue entry at the head of the selected queue. If there is no entry at the head of the selected queue, step 73 is followed by step 86 , otherwise step 73 is followed by step 74.

At step 74, the queue traversal logic 40 examines a queue entry at the head of the queue selected at step 72. For example, at step 74, the queue traversal logic 40 reads information regarding the frame at the head of the selected queue, such as the length of the frame and whether the frame is part of guaranteed or available bandwidth, by reading the contents of the queue entry for the frame. The queue traversal logic 40 may also or alternatively read similar information regarding the frame at the head of the queue from one or more of the frame buffers in the frame buffer list storing the frame itself.

At step 75 the queue traversal logic 40 determines whether the frame at the head of the selected queue is associated with a credit based flow control protocol, for example by reading a field within the queue entry for the frame. If so, then step 75 is followed by step 76. Otherwise, step 75 is followed by step 80.

At step 76 the queue traversal logic 40 determines whether the frame at the head of the selected queue is associated with a store and forward flow control mode. Such a determination may, for example, be made by reading a field within the queue entry for the frame. If the frame is associated with a store and forward flow control mode, then step 76 is followed by step 78. Otherwise step 76 is followed by step 80.

At step 78 the queue traversal logic determines whether there are sufficient transmit credits associated with the queue list to transmit the frame at the head of the selected queue. The queue traversal logic may, for example, make this determination based on a length of the frame as indicated in the queue entry for the frame, together with a transmission credit counter associated with the queue list. The transmission credit counter associated with the queue list may, for example, be stored in or derived from an entry associated the queue list in the flow credit table 43, as shown in FIG. 1. Since at step 78 the frame is known to be associated with store and forward flow control, the number of available transmit credits associated with the queue list must be at least as great as the number of credits needed to transmit the complete frame for there to be sufficient transmit credits at step 78. If the queue traversal logic 40 determines at step 78 that there are not sufficient transmission credits associated with the queue list to transmit the frame at the head of the selected queue, then step 78 is followed by step 72, in which the queue traversal logic 40 selects the next highest priority queue for examination. Otherwise, step 78 is followed by step 80.

At step 80, the queue traversal logic 40 determines whether the frame at the head of the queue selected at step 72 is part of the guaranteed bandwidth for the connection on which the frame was received. For example, the queue traversal logic 40 may, at step 80, examine the contents of the queue entry for the frame at the head of the queue selected at step 72 in order to determine if that frame is part of any such guaranteed bandwidth. Indication of whether a frame is part of the guaranteed bandwidth for the connection on which it was received may, for example, be written to the queue entry for that frame by the rate policing logic 48, as shown in FIG. 1. If the queue traversal logic determines at step 80 that the frame at the head of the queue selected at step 72 is part of the guaranteed bandwidth for the connection on which it was received, then step 80 is followed by step 82, in which the frame is dequeued for future transmission. Otherwise, step 80 is followed by step 81. At step 81, the queue traversal logic determines whether indication of a frame has previously been stored in a set-aside buffer during the current queue list traversal. If so, then step 81 is followed by step 86. Otherwise, step 81 is followed by step 84. Since at step 84 the frame at the head of the queue selected at step 72 is known to not be within the guaranteed bandwidth for the connection on which it was received, the frame is set aside, to be dequeued in the event that no guaranteed bandwidth frame at the head of a queue in the queue list can be dequeued. At step 84, the frame may be set aside, for example, by storing an indication, such as a pointer, identifying the frame for future reference, into the set-aside buffer. Accordingly, step 84 is only performed once per queue list traversal. In this way, once a non-guaranteed bandwidth frame has been set aside, it will not be replaced by any non-guaranteed bandwidth frame from a subsequently traversed, lower priority queue in the queue list. Step 84 is followed by step 86.

At step 86, the queue traversal logic 40 determines whether the queue selected at step 72 is the last queue in the queue list. If not, then step 86 is followed by step 72, in which the queue traversal logic 40 selects the next highest priority queue in the queue list for examination. Otherwise, step 86 is followed by step 87, in which the queue traversal logic 40 determines whether a frame has been set aside during the current queue list traversal. If a frame has been set aside during the current queue list traversal, then step 87 is followed step 88, in which the queue traversal logic dequeues the previously set-aside frame. Such a set-aside frame is, accordingly, the highest priority, non-guaranteed bandwidth frame which either may immediately be transmitted in part, or for which sufficient transmission credits are currently available to completely transmit. If no frame has been set aside during the current queue list traversal, then step 87 is followed by step 89, since there is no frame to dequeue.

FIG. 4 shows an illustrative format of a connection descriptor 100, including fields for storing information related to an associated virtual connection. The connection descriptor 100 is shown including a buffer pool identifier 102, for indicating receive buffer memory associated with the connection. Buffers may be allocated from a buffer pool associated with the connection to store received frames associated with the connection. A queue list identifier 104 indicates a queue list associated with the connection. Frames received over the associated connection are enqueued to a queue within the queue list indicated by the queue list identifier 104. The specific queue within the queue list to which such received frames are enqueued is indicated by a queue identifier 106.

Further in the connection descriptor 100, a QFC enable field 108 indicates whether a credit based flow control protocol, such as Quantum Flow Control (QFC), is to be applied to frames received over the associated connection. A flow control mode field 110 indicates whether a store and forward or cut-through flow control mode is to be used for frames received over the connection. In general, because the cut-through flow control mode permits transmission of a frame to begin before the transmitter has sufficient flow control credits to transmit the complete frame, it is used to support those connections which are relatively more delay sensitive. Because connections which employ cut-through flow control may create head of queue blocking, performance of lower priority connections using store and forward flow control may suffer as a result. Accordingly, store and forward flow control is generally used for connections which are relatively less delay sensitive.

Other fields within the connection descriptor format 100 shown in FIG. 4 include an interval active field 112. The interval active field 112 may be used to store an indication of whether a rate policing timing interval is currently active. An interval start time 114 is used by the rate policing logic to store a start time of the most recent rate policing timing interval. The assigned Bc field 116 is used to store a level or amount of guaranteed bandwidth (also sometimes referred to as "committed bandwidth", "committed throughput", or "committed information rate (CIR)"), that has been assigned to the associated connection. Similarly, the assigned Be field 118 stores a level or amount of available bandwidth (also sometimes referred to as "excess bandwidth" or "excess throughput"), that has been assigned to the associated connection. Current amounts of received guaranteed bandwidth and received available bandwidth for the connection associated with the connection descriptor 100, with regard to a current rate policing interval, are stored in the current Bc and current Be fields 120 and 122 respectively. A rate policing mode field 124 stores an indication of a rate policing mode to be used for the connection associated with the connection descriptor 100. An interval duration field 125 is used to store the rate policing interval duration to be used for performing rate policing on the virtual connection associated with the connection descriptor 100. Steps performed in an illustrative rate policing mode are described in connection with FIG. 14 below.

FIG. 5 shows an illustrative format for a queue list descriptor 140, used by the disclosed system to store information related to a queue list, such as the queue list 27 shown in FIG. 1. The queue list descriptor 140 includes a head pointer 142 indicating a head of a linked list of queue descriptors for the queues in the queue list associated with the queue list descriptor 140. A queue list congested count field 144 may be used to store a count of the number of high priority queues in the associated queue list which are currently congested. When this field is non-zero, all queues in the associated queue list implement congestion avoidance and only enqueue guaranteed bandwidth data units. A queue list queue size field 146 is used to store the number of queues in the associated queue list, and a queue list frame size limit field 148 may be used to store a maximum number of data units allowed on all queues contained within the associated queue list. If there is no such limit, the field 148 contains a value of zero.

FIG. 6 shows an illustrative format for a queue descriptor 160 corresponding to the queue descriptors 30 shown in FIG. 1. Consistent with storing the queue descriptors of a queue in a linked list, the next queue descriptor pointer field 162 contains a pointer to a next queue descriptor. The head pointer field 164 contains a pointer to a queue entry representing a data unit stored at the head of the queue associated with the queue descriptor 160.

A queue high water mark field 168 is provided to store a high water mark against which the queue size is compared. If the associated queue is not marked as congested, and the queue size reaches the high watermark, the queue is marked as congested by writing the queue congested field 180 with a predetermined value indicating that the queue is now congested. A queue low water mark field 170 is used to store a queue size low watermark, against which the queue size is compared. If the associated queue is marked as congested, and the queue size falls to the low watermark, the queue congested field 180 is written with another predetermined value indicating that the queue is no longer congested.

A queue size limit field 172 may be used to store a value indicating a maximum amount of information which may be stored in the associated queue. For example, the field 172 may be used to store a value indicating a maximum number of fixed sized data units, such as cells, which may be stored in buffers associated with queue entries in the queue. A queue size field 174 may be used to store a current size of the associated queue, for example, in terms of cells, bytes, or other units. In this way the disclosed system determines the amount of received data currently stored in frame buffers associated with the queue entries of the queue. The frame enqueuing logic 26 increments this field as data units are enqueued, and the queue traversal logic 40 decrements this field as data units are dequeued.

The queue descriptor 160 is further shown including a time-stamp range selection field 176. The time-stamp range selection field 176 may be used to store a value indicating a time-stamp range for all frames stored on the associated queue. The value stored in the time-stamp range selection field 176 is copied to the buffer descriptor (see FIG. 9) for the first frame buffer of each frame stored in the queue as received frames are enqueued by the frame enqueuing logic 26.

The queue descriptor 160 is further shown including a queue list congestion enable field 178. The value stored in the queue list congestion enable field 178 indicates whether the entire queue list will be marked as congested if the queue associated with the queue descriptor 160 becomes congested. A tail pointer field 182 stores a pointer to a queue entry in the associated queue which is at the tail of the queue. The queue enable field 184 may be used to store a value indicating whether frames may be enqueued to the queue associated with the queue descriptor 160. When the value stored in the queue enable field 184 indicates that frames cannot be enqueued to the queue associated with the queue descriptor 160, received frames associated with the queue are discarded.

FIG. 7 shows an illustrative format of a queue entry 200. The queue entry 200 shown in FIG. 7 corresponds to the queue entries 32 and 34 shown in FIG. 1. A next queue entry pointer field 202 in the queue entry format 200 stores a pointer to a next queue entry residing on the same queue as the queue entry 200. A flow control mode field 204 indicates whether the frame associated with the queue entry 200 stores a data unit associated with cut-through or store-and-forward flow control mode. A QFC enable field 206 is used to store an indication of whether the data unit associated with the queue entry 200 is being sent over a QFC connection. When the QFC enable field 206 indicates that the associated frame is being sent over a QFC connection, then QFC flow control is applied to the frame.

As further shown in the queue entry format 200 of FIG. 7, a DE bit field 208 indicates whether or not the DE bit in the associated frame is set. If the DE bit field 208 indicates that the DE bit in the associated frame is set, then the frame is considered part of the available bandwidth traffic for the associated connection. The DE bit field 208 may be set either as a result of the original DE bit value in the received data unit being set, or as a result of modification of the DE bit value in the received frame by the rate policing logic 48. If the DE bit field 208 indicates that the DE bit is not set, then the associated frame is considered to be guaranteed bandwidth traffic. A frame pointer field 210 stores a pointer to a first frame buffer storing a portion of a frame associated with the queue entry 200.

An illustrative format for a buffer pool descriptor 211 is shown in FIG. 8. The buffer pool descriptor 211 shown in FIG. 8, for example, corresponds to the buffer pool descriptors 41 shown in FIG. 1. Initial values for the fields shown in the buffer pool descriptor 211 may be written by software executing on the processor 44 shown in FIG. 1. As shown in FIG. 8, the buffer pool descriptor 211 includes a buffer pool enable field 212, a current individual buffer count field 213, a current shared buffer count field 214, and an assigned shared buffer count field 215. The value of the buffer pool enable field 212 indicates whether a buffer pool associated with the buffer pool descriptor 211 is available for crediting and debiting of buffers. The value of the current individual buffer count field 213 indicates the number of dedicated buffers currently available to this buffer pool. The dedicated buffers associated with a buffer pool are available exclusively to the QoS group associated with that buffer pool, and are not shared with other QoS groups. The value of this field is decremented each time the associated buffer pool is debited, for example, by the frame enqueuing logic 26 of FIG. 1 in response to use of a dedicated buffer from the associated buffer pool to store a portion of a received data unit. The value of this field may be incremented each time the associated buffer pool is credited, for example, by the transmit unit 42 when a received frame stored in a dedicated buffer is transmitted out of the network switch 10 as shown in FIG. 1.

The value of the current shared buffer count field 214 indicates the number of shared buffers currently available to the buffer pool associated with the buffer pool descriptor 211. Shared buffers available to the associated buffer pool may also be used by QoS groups associated with other buffer pools. The value of the current shared buffer count field 214 may be incremented and decremented in response to shared buffers being added and removed from the pool, for example, by the transmit unit 42 and frame enqueuing logic 26 as shown in FIG. 1 respectively.

The value of the assigned shared buffer count 215 indicates the number of shared buffers assigned to the associated buffer pool. This value is the number of buffers within the buffer pool which may be shared with other buffer pools. In an illustrative embodiment, in which the buffer pool of a buffer is indicated by a field within the buffer descriptor for that buffer, the value of the current shared buffer count is compared to the value of the assigned shared buffer count field 215 during returns of buffers to the associated buffer pool. If the values are equal, the value of the current individual buffer count field 213 is incremented.

FIG. 9 shows an illustrative format of a buffer descriptor 220 corresponding to the frame buffers 36 and 38 shown in FIG. 1. A next buffer pointer field 222 indicates the address of a next frame buffer in a multi-buffer frame. A byte-count field 224 stores a value indicating the number of bytes of a data unit that are stored in the frame buffer associated with the buffer descriptor 220.

A time-stamp range selection field 226 stores an acceptable range with respect to the frame time-stamp that was written in the time-stamp field 228 by the frame enqueuing logic 26 as the data unit was received. If the difference between the value in the time-stamp field 228 and a current time, for example, determined when the data unit is dequeued, does not fall within the range indicated by the value in the time-stamp range selection field 226, then the data unit is considered to have timed-out, and is discarded. The difference between the value in the time-stamp field 228 and the current time may also be considered the "age" of the data unit. The time-stamp selection field 176 stores values associated with the following meanings: 1) time-stamping disabled; 2) relatively low range data unit ages permitted, for example less than 1 second; 3) relatively mid-range of data unit ages permitted, for example less than 32-seconds; and 4) relatively high range of data unit ages permitted, for example less than 17 minutes.

The EOP ("end of packet") field 230 may be used to store an indication that the frame buffer associated with the buffer descriptor 220 is the last buffer of a frame. The SOP field 232 may be used to store a value indicating that the frame buffer associated with the buffer descriptor 220 is the first buffer of a frame. Where both the EOP field 230 and SOP field 232 are asserted, then the frame is contained in a single buffer. Indication of the buffer pool from which the buffer associated with the buffer descriptor 220 was allocated may also be stored in the buffer descriptor 220. Such an indication may be used during buffer returns in order to identify the proper buffer pool that a buffer is to be returned to.

Figures 10, 11:
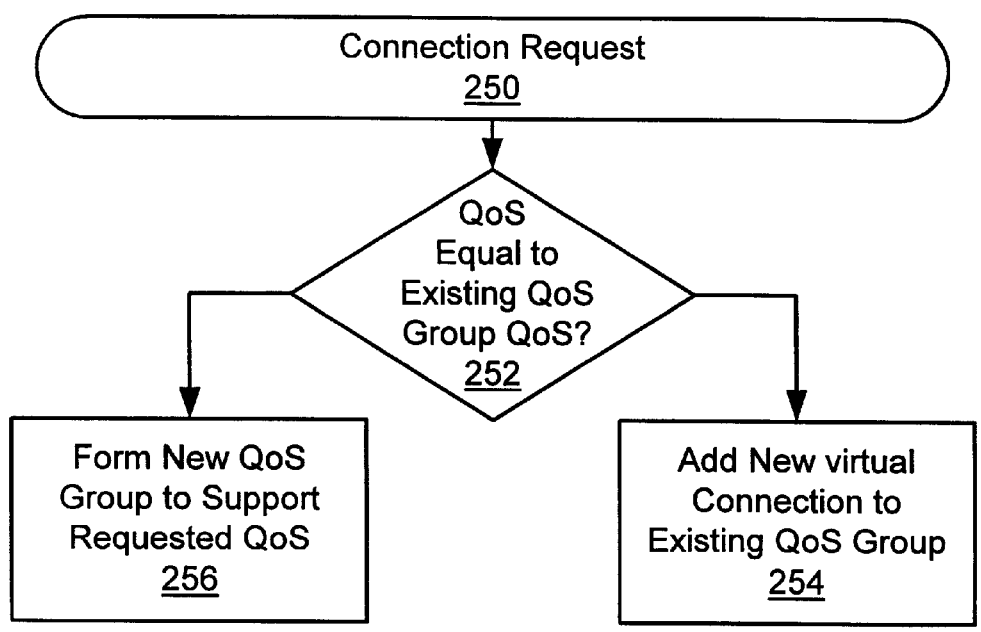
FIG. 10 shows an illustrative format of a scheduling table.
FIG. 11 shows steps performed to assign a connection to a QoS group in response to a connection request.

An illustrative format of a scheduling table 240 is shown in FIG. 10. The scheduling table 240 of FIG. 10 corresponds to the scheduling table 39 as shown in FIG. 1. As shown in FIG. 10, the scheduling table 240 includes a number of entries 241, shown as entries 241a through 241g. Each of the entries 241 includes indication of a quality of service (QoS) group, for example, including a pointer or other indication of the queue list descriptor for the queue list of that QoS group. As shown in FIG. 10, entry 241a indicates QoS group A, entry 241b indicates QoS group B, entries 241c and 241d indicates QoS group C and so on. A given QoS group may be allocated one or more entries in the scheduling table 240, depending on the priority of the QoS group.

Each entry in the scheduling table 240 represents a portion of bandwidth on an output link associated with the scheduling table 240. Accordingly, QoS groups associated with greater number of entries in the scheduling table 240 will be allocated a greater proportion of the bandwidth of the associated output link. In this way a greater amount of output link bandwidth may be allocated to QoS groups associated with relatively higher QoS levels. The values in the scheduling table 240 are, for example, loaded by software executing on the microprocessor 44 as shown in FIG. 1.

FIG. 11 illustrates steps performed by software executing on the microprocessor 44 as shown in FIG. 1, in order to service a request to establish a new virtual connection. At step 250, the software receives a connection request 250. The connection request, for example, includes an indication of one or more QoS parameters. At step 252, the software determines whether the QoS level indicated in the connection request 250 is equivalent to a QoS level associated with an existing QoS group. If so, step 252 is followed by step 254, in which a new virtual connection is established and added to the existing QoS group identified at step 252. Otherwise, at step 256, the software forms a new QoS group to support the QoS level in the connection request 250.

Figure 12:
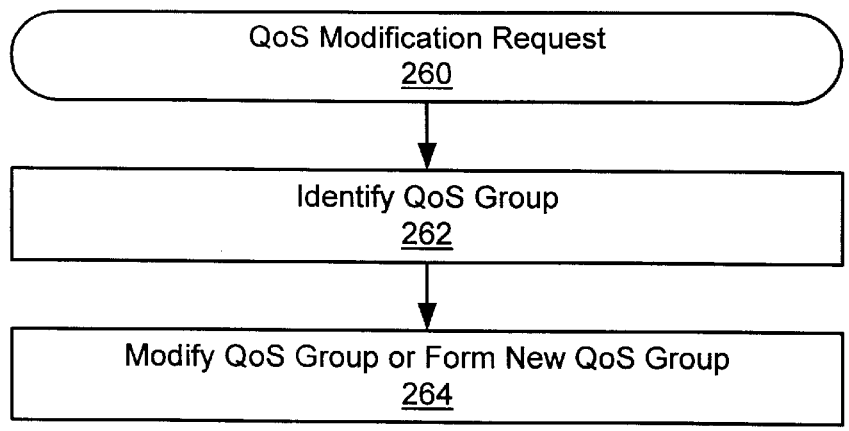
FIG. 12 shows steps performed to modify the QoS levels of one or more virtual connections.

A series of steps performed by the software executing on microprocessor 44 shown in FIG. 1 in order to process a request to modify the QoS of one or more established virtual connections is shown in FIG. 12. The software receives a QoS modification request at step 260. At step 262, the software identifies a QoS group containing the virtual connections which are indicated by the QoS modification request received at step 260. At step 264, the software modifies the QoS of a QoS group in the event that all virtual connections indicated in the QoS modification request received at step 260 are contained within that one QoS group, and the QoS group contains no other virtual connections. If no such QoS group is identified, than the software forms a new QoS group with the requested modified QoS levels, and assigns the existing virtual connection to the newly formed QoS group.

Figure 13:
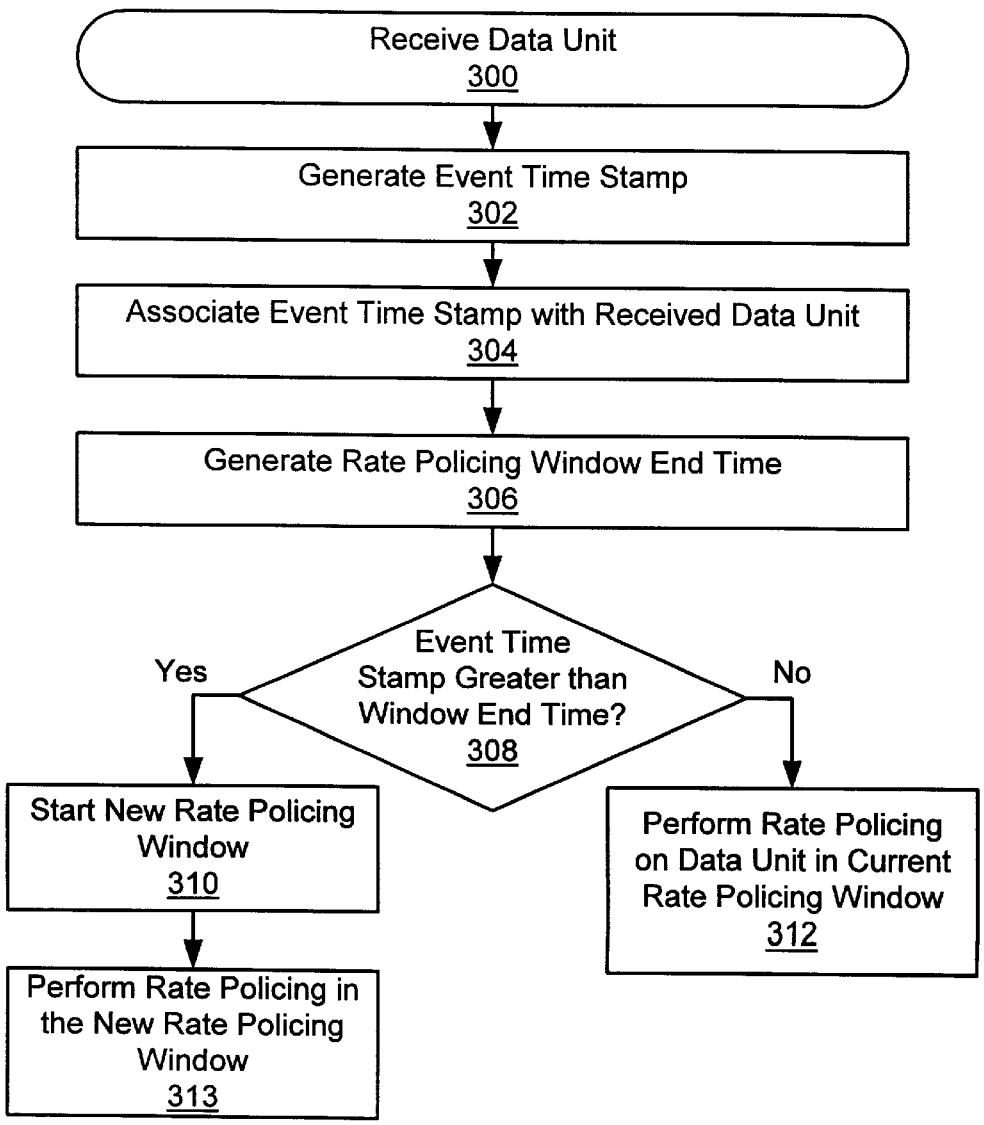
FIG. 13 shows steps performed to determine a rate policing window in which a received data unit is to be rate policed.

FIG. 13 shows steps performed in an illustrative embodiment of the disclosed system to perform event based rate policing. The steps shown in FIG. 13, are for example, performed by the rate policing logic 48 shown in FIG. 1, in cooperation with the other elements including data structures, also shown in FIG. 1. At step 300, the system receives a data unit, which is to be rate policed. At step 302, the disclosed system generates an event time stamp, which is associated with the received data unit at step 304. Steps 300, 302, and 304 are, for example, performed by the receiver unit 18 as shown in FIG. 1. The association of the event time stamps with the received data unit at step 304 may be performed in various ways. In an illustrative embodiment, the event time stamp is written into a field within a buffer descriptor storing a first portion of the data unit received at step 300. The time stamp field 228 in the buffer descriptor 220 as described in connection with FIG. 9 may be used for this purpose. Alternatively, the time stamp may be associated with the received data unit by writing the time stamp into a field within an internal data unit header, as would be stored within the buffer itself which stores a first portion of the received data unit.

At step 306, the disclosed system generates a rate policing window end time. For example, to generate the rate policing window end time at step 306, a rate policing window start time is added to a rate policing window duration associated with the virtual connection on which the data unit was received at step 300. Such values may be indicated within fields of the connection descriptor for that virtual connection. The connection descriptor 100 as shown in FIG. 4, includes an interval start time field 114, which may be used to store a current rate policing window associated with the virtual connection for that connection descriptor. Similarly, the interval duration field 125, shown in the connection descriptor format 100 of FIG. 4, stores a value indicating the duration of the rate policing window for the virtual connection associated with that connection descriptor. Step 306 is performed, for example, by the rate policing logic 48 as shown in FIG. 1.

At step 308, the rate policing logic 48 determines whether the event time stamp associated with the received data unit is greater than the rate policing window end time generated at step 306. If so, step 308 is followed by step 310 in which the rate policing logic 48 starts a new rate-policing window. Otherwise step 308 is followed by step 312, in which the rate policing logic 48 performs rate policing on the received data unit within the current rate-policing window. Within step 310, the rate policing logic 48 starts a new rate policing window by writing the event time stamp generated at step 302 into the interval start time field 114 within the connection descriptor 100 as illustrated in FIG. 4. The step 310 further includes restarting a rate policing window associated with the virtual connection. Further at step 310 rate policing of the data unit received at step 300 is performed within the newly started rate policing window.

Figure 14:
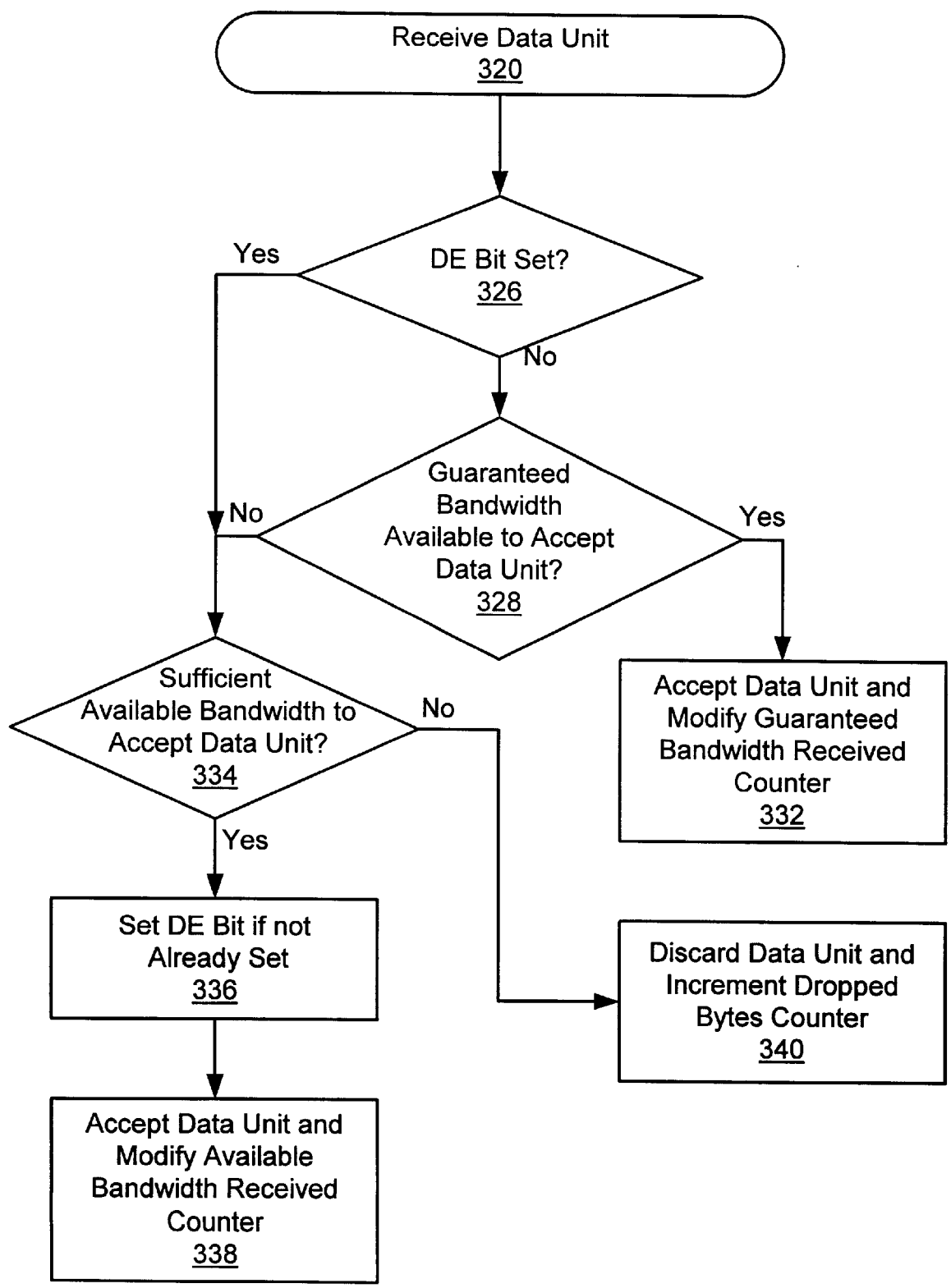
FIG. 14 shows steps performed during rate policing of a received data unit.

FIG. 14, illustrates one illustrative rate policing mode supported by the rate policing logic 48 to rate police a received data unit. The disclosed system may be embodied having multiple alternative rate policing modes. Such alternative rate policing modes may be chosen on a per connection basis, for example in response to setting of values within the rate policing mode field 124 in the connection descriptor 100 as shown in FIG. 4 by program code executing on the processor 44. Accordingly, the steps of FIG. 14, show an example of one rate policing technique, which may be one of several embodied in the rate policing logic 48.

At step 320, as shown in FIG. 14, the disclosed system receives a data unit. Step 320 may, for example, be performed by the receiver unit 18 as shown in FIG. 1. At step 326, the system determines whether a discard enabled indication is present within the received data unit. Such a discard-enabled indication may consist of an asserted DE bit within the received data unit. If a discard-enabled indication is found at step 326, then step 326 is followed by step 334. Otherwise, step 326 is followed by step 328. At step 328, the rate policing logic 48 determines whether there is sufficient guaranteed bandwidth available within the rate-policing window for the virtual connection associated with the received data unit to accept the data unit. If so, then step 328 is followed by step 332, in which the rate policing logic 48 accepts the received data unit and modifies the appropriate guaranteed bandwidth counter or counters. For example, as shown in FIG. 4, a current committed information byte count field 120 within the connection descriptor associated with the virtual connection may be incremented by the number of bytes in the data unit received at step 320. Alternatively, the number of bytes in the data unit received at 320 may be decremented from the current committed bytes received field 120 in the case where that field is initialized to a maximum number of guaranteed bandwidth bytes that may be received within a single rate policing window for the virtual connection. Within step 332, the step of accepting the data unit may for example, include enqueuing one or more receive buffers storing the data unit to a receive queue within a queue list associated with the connection on which the data unit was received.

If the rate policing logic 48 determines there is not sufficient guaranteed bandwidth available within the rate-policing window for the virtual connection associated with the received data unit to accept the data unit, then step 328 is followed by step 334. At step 334, the rate policing logic 48 determines whether there is sufficient available bandwidth associated with the virtual connection on which the data unit was received at step 320 to accept the data unit. For example, the rate policing logic may compare a length of the received data unit to a value indicating the amount of available bandwidth remaining within the rate policing window for the associated virtual connection, as found in a current available bandwidth counter stored in association with that virtual connection. Such a value may be determined in an illustrative embodiment by finding a difference between the current available bandwidth received counter 122 and the assigned available bandwidth field 118 shown in FIG. 4. If the rate policing logic 48 determines that there is sufficient available bandwidth to accept the data unit at step 334, step 334 is followed by step 336. At step 336 a discard indication associated with the received data unit is set if such an indication was not set in the data unit when it was received. Step 336 is followed by step 338. If the rate policing logic 48 determines there is not sufficient available bandwidth to accept the data unit at step 334, then step 334 is followed by step 340, in which the rate policing logic discards the data unit, and increments a dropped bytes counter associated with the virtual connection on which the data unit was received.

In another rate policing mode that may be supported by the rate policing logic 48, a single data unit may be allocated both guaranteed bandwidth and available bandwidth from a single virtual connection. In such a case, the respective received byte counters associated with guaranteed and available bandwidth for the connection would be incremented according to the number of bytes from each that were used to receive the data unit.

Figure 15:
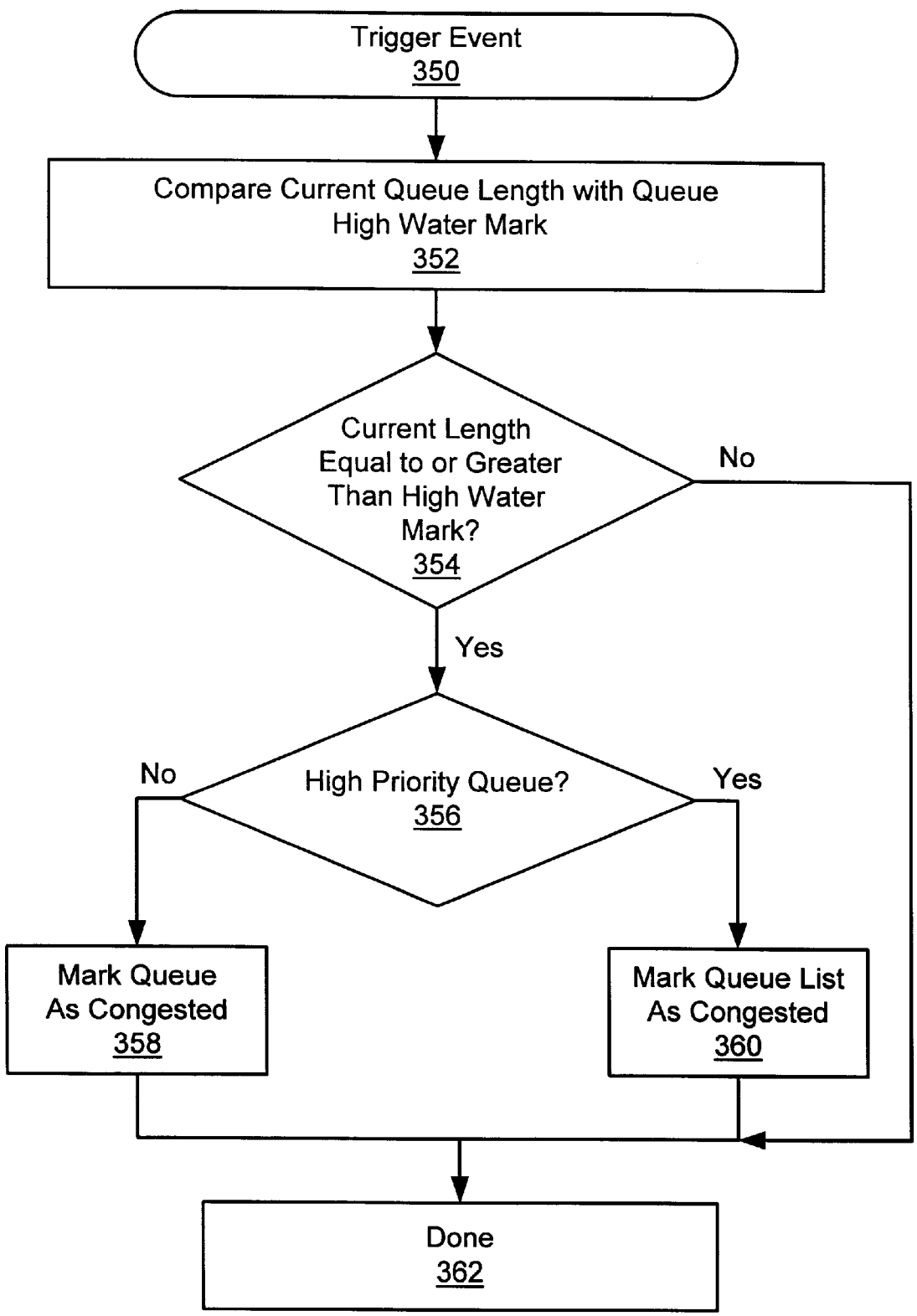
FIG. 15 shows steps performed to determine if one or more queues in a queue list are congested.
Figure 16:
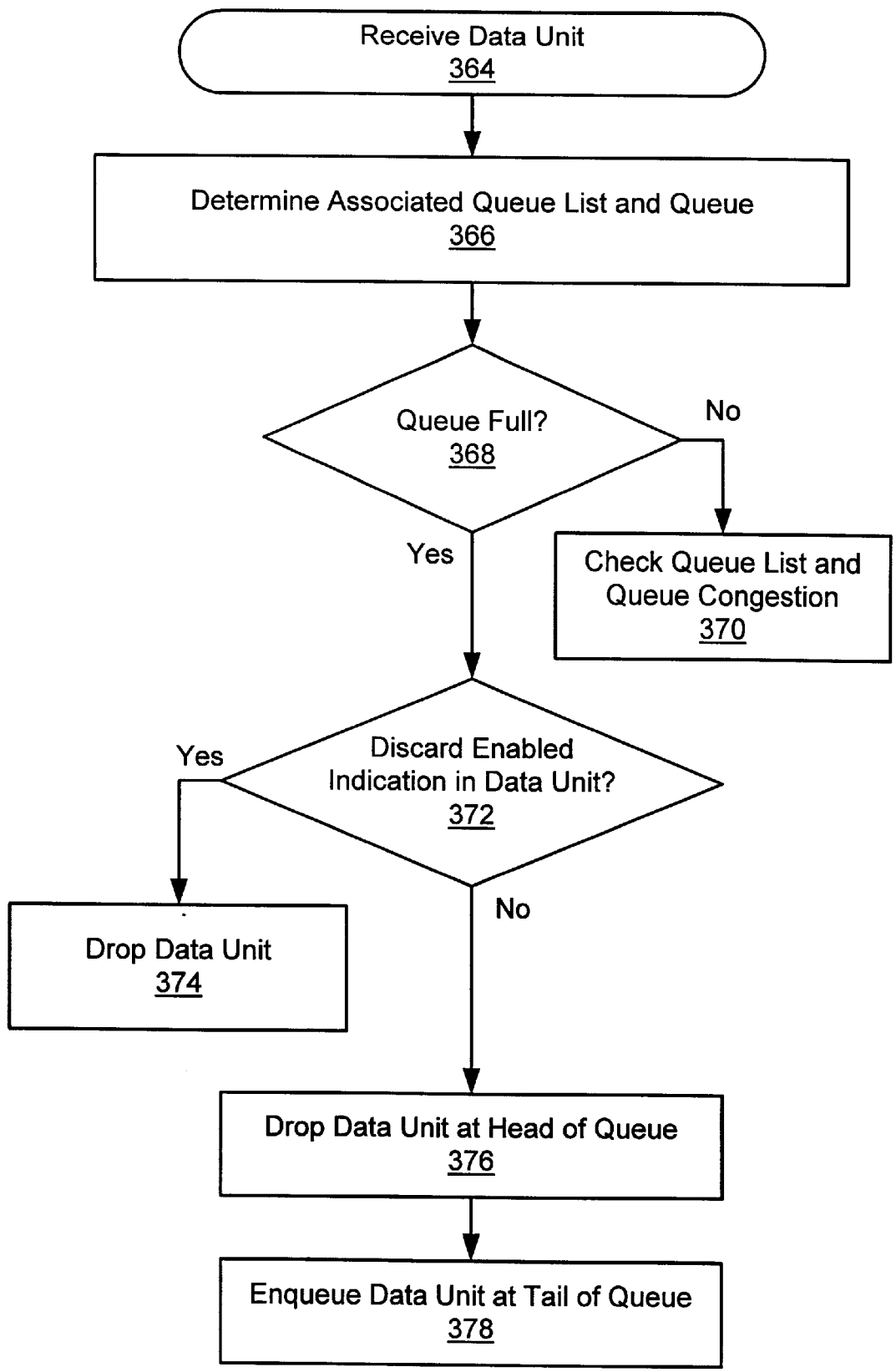
FIG. 16 shows steps performed to selectively discard received data units in response to one or more receive queues being full.
Figure 17:
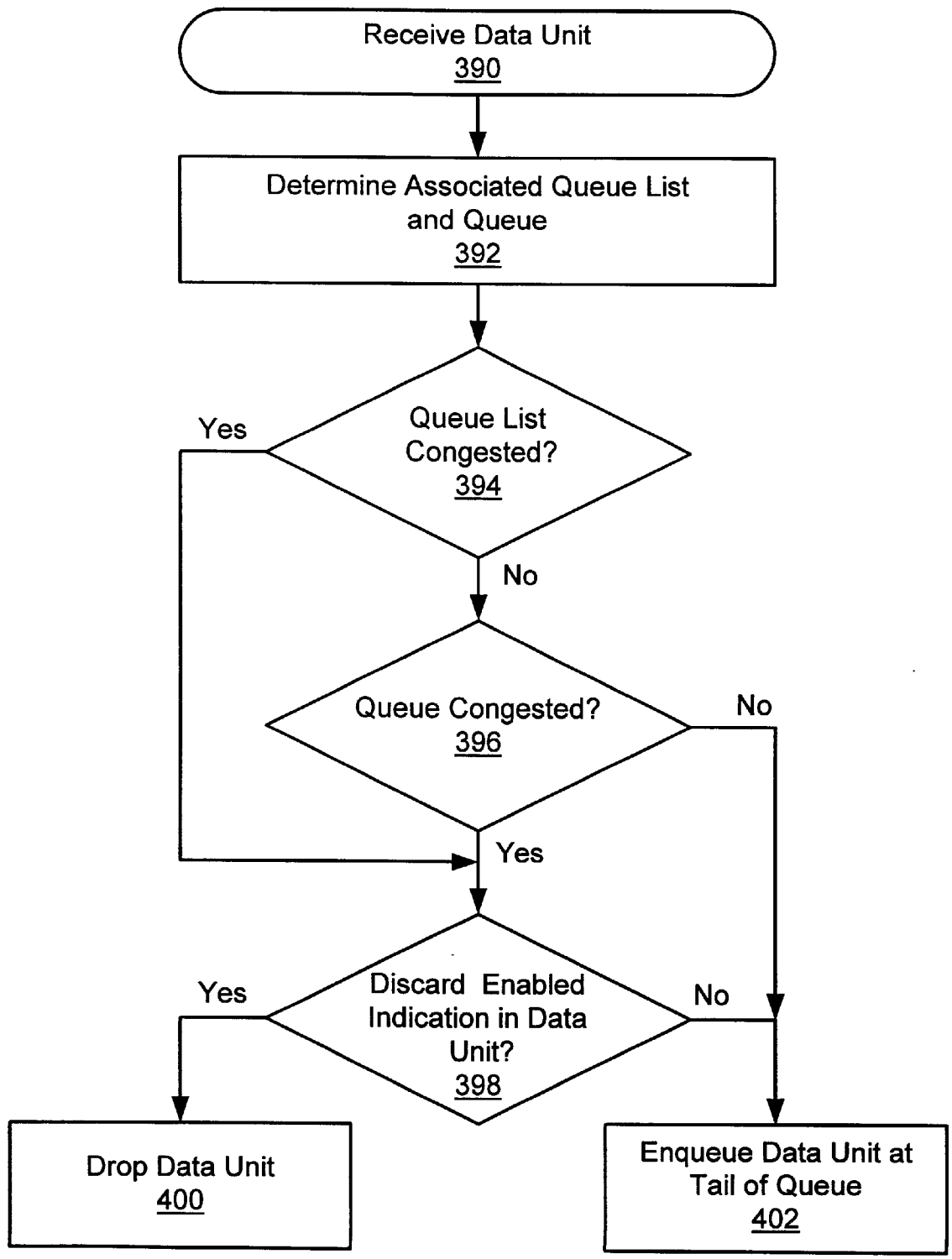
FIG. 17 shows steps performed to selectively enqeue received data units.

FIG. 15 through FIG. 17 show steps performed by the disclosed system to manage congestion experienced by data units received within the network switch 10 as shown in FIG. 1. At step 350 in FIG. 15, a trigger event occurs which causes the disclosed system to begin performing steps associated with congestion management. Such a trigger event may, for example consist of receipt of a data unit, expiration of a timer, transmission of a data unit, or some other appropriate event. The steps triggered by the trigger event 350 may be performed by the queue traversal logic 40, frame enqueuing logic 26, and/or the transmit unit 42 as shown in FIG. 1. As shown in FIG. 15, the steps performed in response to the trigger event 350 are applied to a single queue within a queue list. Such a single queue, for example, may be selected based on the queue and queue list indicated by a connection descriptor associated with a virtual connection on which a data unit was received by the receiver unit 18 as shown in FIG. 1.

At step 352, a current queue length of the selected queue is compared with a high water mark associated with the selected queue. At step 354, a determination is made as to whether the current length of the selected queue is equal to or greater than the high water mark associated with the selected queue. If the current length of the selected queue is greater than or equal to the associated high water mark, then step 354 is followed by step 356. Otherwise, step 354 is followed by 362, and the steps are complete. At step 356, a determination is made as to whether the selected queue is a high priority queue. If so, then step 356 is followed by step 360, in which the queue list to which the queue belongs is marked as congested. If the selected queue is not a high priority queue then step 356 is followed by step 358, in which the selected queue itself is marked as congested. For purposes of illustration, a queue may be marked as congested through writing a predetermined value to the queue congestion field 180 within the associated queue descriptor 160 as shown in FIG. 6. A queue list may be marked as congested by incrementing the queue list congested count field 144 of the associated queue list descriptor 140 as shown in FIG. 4. Both steps 358 and 360 are followed by step 362, and checking of the queue is complete. A queue may be considered to be high priority for purposes of the comparison at step 356 if the queue is the highest priority queue within its queue list, or alternatively, if the queue is within some predetermined number of highest priority queues within its queue list.

FIG. 16 illustrates steps performed by the disclosed system to manage congestion within the network switch 10 as shown in FIG. 1 in response to receipt of a data unit as shown in step 364. The steps shown in FIG. 16 may be performed by the queue traversal logic 40 as shown in FIG. 1. At step 366, the disclosed system determines an associated queue list and queue for the virtual connection on which the data unit was received at step 364. At step 368, a determination is made as to whether the associated queue is full, for example, in response to the contents of queue size field 174 and queue size limit field 172 in the queue's queue descriptor 160 as shown in FIG. 6. If not, then at step 370, for example, the disclosed system checks the queue list and queue associated with the virtual connection for the data unit for indications of congestion. An example of steps performed within step 370 is illustrated by the flow chart shown in FIG. 17.

At step 372, a determination is made as to whether a discard enabled indication, such as a set DE bit, is contained within or associated with the data unit received at step 364. If so, then step 372 is followed by step 374 in which the data unit is dropped. Otherwise, step 372 is followed by step 376, in which the disclosed system drops one or more data units stored at the head of the queue associated with the virtual connection of the received data unit. Step 376 is followed by step 378, in which the received data unit is enqueued at the tail of the queue associated with the virtual connection of the received data unit.

FIG. 17 shows steps performed in an illustrative embodiment of the disclosed system to determine whether a queue list and/or queue associated with a received data unit are congested. At step 390 a data unit is received, and at step 392 an associated queue list and queue for the virtual connection on which the data unit was received are identified. At step 394, the system determines whether the queue list associated with the virtual connection identified at step 392 is congested, for example in response to the value of the queue list congested count field 144 in the queue list descriptor 140 associated with the queue list. If so, step 394 is followed by step 398. Otherwise, step 394 is followed by step 396, in which the system determines whether the queue associated with the virtual connection for the received data unit is congested, for example, in response to the value of the queue congestion field 180 as shown in the queue descriptor 160 of FIG. 6. If so, step 396 is followed by step 398. Otherwise, step 396 is followed by step 402, in which the received data unit is enqueued at the tail of the queue associated with the virtual connection on which it was received. At step 398, a determination is made as to whether a discard enable indication, such as a set DE bit, is contained within or associated with the received data unit. If not, step 398 is followed by step 402. Otherwise, step 398 is followed by step 400, in which the received data unit is discarded.

Those skilled in the art should readily appreciate that the invention may be embodied in part or in whole using hardware components such as Application Specific Integrated Circuits or other hardware, or some combination of hardware components and software.

While the invention is described through the above exemplary embodiments, it will be understood by those of ordinary skill in the art that modifications to and variations of the illustrated embodiments may be made without departing from the inventive concepts herein disclosed. Specifically, while the preferred embodiments are disclosed with reference to messages passed between users of a computer network, the invention may be employed in any context in which messages are passed between communicating entities. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method of determining an event-based rate policing window, comprising:

receiving a data unit;

generating an event time stamp reflecting a time at which said data unit was received;

associating said event time stamp with said data unit;

generating a rate policing window end time by adding a rate policing window start time to a rate policing window duration;

comparing said event time stamp with said rate policing window end time;

starting, in the event that said event time stamp indicates a time subsequent to said rate policing window end time, a new rate policing window;

wherein said data unit is received on a virtual connection, and wherein said rate policing window start time, said rate policing window end time, said rate policing window duration, and said new rate policing window are associated with said virtual connection; and wherein said rate policing window start time defines a time at which a current rate policing window started, wherein said rate policing window duration defines a length of said current rate policing window, wherein said rate policing window end time defines an end of said current rate policing window, and wherein said current rate policing window defines a time interval during which a predetermined amount of bandwidth is reserved as guaranteed bandwidth for use by data units received on said virtual connection during said current rate policing window.

2. The method of claim 1, further comprising:

performing, in the event said event time stamp does not indicate a time subsequent to said rate policing window end time, rate policing on said data unit, said rate policing including determining whether said data unit is to be considered part of said guaranteed bandwidth of said virtual connection.

3. The method of claim 2, further comprising:

writing, in the event that said data unit is not to be considered part of said guaranteed bandwidth of said virtual connection, a discard enabled indicator associated with said data unit.

4. The method of claim 3, wherein said discard enabled indicator is a discard enabled bit within said data unit.

5. The method of claim 3, wherein said discard enabled indicator is a flag in a descriptor data structure associated with at least one memory buffer storing said data unit.

6. The method of claim 1, wherein said starting said new rate policing window includes setting said rate policing window start time associated with said virtual connection equal to said event time stamp.

7. The method of claim 1, wherein said starting said new rate policing window includes setting a field associated with said virtual connection to a predetermined value.

8. The method of claim 7, wherein said predetermined value represents the maximum amount of data which may be received using said guaranteed bandwidth over said connection during said rate policing window duration.

9. The method of claim 7, wherein said predetermined value is zero.

10. A system for determining an event-based rate policing window, comprising:

receiver logic operable to receive a data unit, generate an event time stamp reflecting a time at which said data was received, and associate said event time stamp with said data unit;

rate policing logic operable to
generate a rate policing window end time by adding a rate policing window start time to a rate policing window duration,
compare said event time stamp with rate policing window end time, and
start, in the event that said event time stamp indicates a time subsequent to said rate policing window end time, a new rate policing window;

wherein said data unit is received on a virtual connection, and wherein said rate policing window start time, said rate policing window end time, said rate policing window duration, and said new rate policing window are associated with said virtual connection; and wherein said rate policing window start time defines a time at which a current rate policing window started, wherein said rate policing window duration defines a length of said current rate policing window, wherein said rate policing window end time defines an end of said current rate policing window, and wherein said current rate policing window defines a time interval during which a predetermined amount of bandwidth is reserved as guaranteed bandwidth for use by data units received on said virtual connection during said current rate policing window.

11. The system of claim 10, wherein said rate policing logic is further operable to perform, in the event said event time stamp does not indicate a time subsequent to said rate policing window end time, rate policing on said data unit, said rate policing including determining whether said data unit is to be considered part of said guaranteed bandwidth of said virtual connection.

12. The system of claim 11, wherein said rate policing logic is further operable to write, in the event that said data unit is not to be considered part of said guaranteed bandwidth of said virtual connection, a discard enabled indicator associated with said data unit.

13. The system of claim 12, wherein said discard enabled indicator is a discard enabled bit within said data unit.

14. The system of claim 12, wherein said discard enabled indicator is a flag in a descriptor data structure associated with at least one memory buffer storing said data unit.

15. The system of claim 10, wherein said rate policing logic is further operable to set said rate policing window start time associated with said virtual connection equal to said event time stamp when starting said new rate policing window.

16. The system of claim 10, wherein said rate policing logic is further operable to set a byte count field associated with said virtual connection to a predetermined value when starting said new rate policing window.

17. The system of claim 16, wherein said predetermined value represents the maximum amount of data which may be received using said guaranteed bandwidth over said connection during said rate policing window duration.

18. The system of claim 16, wherein said predetermined value is zero.

19. A system for determining an event-based rate policing window, comprising:

means for receiving a data unit;

means for generating an event time stamp reflecting a time at which said data was received;

means for associating said event time stamp with said data unit;

means for generating a rate policing window end time by adding a rate policing window start time to a rate policing window duration;

means for comparing said event time stamp with rate policing window end time;

means for starting, in the event that said event time stamp indicates a time subsequent to said rate policing window end time, a new rate policing window;

wherein said data unit is received on a virtual connection, and wherein said rate policing window start time, said rate policing window end time, said rate policing window duration, and said new rate policing window are associated with said virtual connection; and wherein said rate policing window start time defines a time at which a current rate policing window started, wherein said rate policing window duration defines a length of said current rate policing window, wherein said rate policing window end time defines an end of said current rate policing window, and wherein said current rate policing window defines a time interval during which a predetermined amount of bandwidth is reserved as guaranteed bandwidth for use by data units received on said virtual connection during said current rate policing window.

* * * * *